US012757077B2

(12) United States Patent
Somashekar et al.

(10) Patent No.: US 12,757,077 B2
(45) Date of Patent: Oct. 6, 2026

(54) GEOLOCATION-BASED NETWORK SLICE ALLOCATIONS FOR DYNAMIC EDGE COMPUTING RESOURCE MANAGEMENT

(71) Applicant: T-MOBILE INNOVATIONS LLC, Overland Park, KS (US)

(72) Inventors: Sharath Somashekar, Overland Park, KS (US); Akriti Kumar, Brambleton, VA (US); Diego Estrella Chavez, McLean, VA (US); Rashmi Kumar, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 294 days.

(21) Appl. No.: 18/441,864

(22) Filed: Feb. 14, 2024

(65) Prior Publication Data

US 2025/0261046 A1 Aug. 14, 2025

(51) Int. Cl.
*H04W 28/26* (2009.01)
*H04W 48/04* (2009.01)

(52) U.S. Cl.
CPC .......... *H04W 28/26* (2013.01); *H04W 48/04* (2013.01)

(58) Field of Classification Search
CPC ..... H04W 24/02; H04W 28/26; H04W 48/04; H04W 48/18
See application file for complete search history.

(56) References Cited

U.S. PATENT DOCUMENTS

| | | |
|---|---|---|
| 11,328,603 B1 | 5/2022 | Paran et al. |
| 11,432,159 B2 | 8/2022 | Buyukdura |
| 2018/0054420 A1 | 2/2018 | Mindte |

(Continued)

FOREIGN PATENT DOCUMENTS

| | | |
|---|---|---|
| CN | 113994744 B | 5/2023 |
| WO | 2020/177869 A1 | 9/2020 |

OTHER PUBLICATIONS

International Search Report and Written Opinion received for PCT Patent Application No. PCT/US2025/015557, mailed on Apr. 4, 2025, 13 pages.

(Continued)

*Primary Examiner* — Timothy X Pham
(74) *Attorney, Agent, or Firm* — Shook, Hardy & Bacon L.L.P.

(57) ABSTRACT

Systems and methods for geolocation-based network slice allocations for dynamic edge computing resource management are provided. In some embodiments, a network function of an operator core network may orchestrate one or more service augmentation platforms on network edge servers based on identifying event(s) where UE use the telecommunications network to access cloud-based service from an edge server within a threshold proximity of the event(s). Orchestration of the service augmentation platform(s) may be based in part on determining a network service classification for the event(s) based on event data collected about the event(s). A network slice for accessing the service augmentation platforms may be granted to UE by the network function based in part on the UE geographic proximity to the location associated with the scheduled events. The network function may de-orchestrate the service augmentation platform based on the end of the event as indicated by the event data.

20 Claims, 7 Drawing Sheets

(56) References Cited

U.S. PATENT DOCUMENTS

| | | | | |
|---|---|---|---|---|
| 2020/0177687 | A1 | 6/2020 | Kodaypak et al. | |
| 2022/0150131 | A1* | 5/2022 | Vandikas | H04L 67/61 |
| 2023/0111373 | A1 | 4/2023 | Chandran | |
| 2023/0224787 | A1 | 7/2023 | Vrzic | |
| 2025/0184237 | A1* | 6/2025 | Chapalamadugu | H04W 24/02 |
| 2025/0184942 | A1* | 6/2025 | Chun | H04W 60/00 |

OTHER PUBLICATIONS

Abbas, K., et al., "Network Slice Lifecycle Management for 5G Mobile Networks: An Intent-Based Networking Approach", IEEE Access, vol. 9, Jun. 8, 2021, pp. 80128-80146.
Ericsson, "Ericsson enables multiple tailored slices for smartphones with Dynamic Network Slice Selection launch", Dynamic Network Slice Selection, Jan. 27, 2022. pp. 1-6.
Ericsson, "FarEasTone and Ericsson mark a breakthrough in 5G network slicing", Nov. 1, 2021. pp. 1-5.
Nhu, C., et al., "Dynamic Network Slice Scaling Assisted by Attention-Based Prediction in 5G Core Network", Research Article, vol. 10, Jul. 18, 2022. pp. 72955-72972.

* cited by examiner

GEOLOCATION-BASED NETWORK SLICE ALLOCATIONS FOR DYNAMIC EDGE COMPUTING RESOURCE MANAGEMENT

BACKGROUND

Edge computing in the context of a 5G telecommunications network involves processing and/or service data from a network resource closer to a consumer of the data in order to reduce latency and improve network efficiency. With the high-speed, low-latency capabilities of 5G networks, such computing tasks can be performed by devices at the edge of the 5G network, avoiding traffic flow and consumption of processing resources within nodes of the operator core network, and providing for faster response time for applications such as content streaming, cloud-based gaming, Internet-of-Things, cloud-based augmented and/or virtual reality, or other applications.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

One or more of the embodiments presented in the disclosure provide for, among other things, geolocation-based network slice allocations for dynamic edge computing resource management. The embodiments presented in the disclosure provide network functionality for telecommunications network operators to provide premium services to users to access cloud-based services. The quality of user experiences associated with using cloud-based services is often a function of the network latency and data throughput capability of network elements along the communications path between a user's user equipment (UE) and the network-connected servers offering the cloud-based services. As opposed to existing technologies, one or more of the embodiments described herein, among other things, provide systems and methods that may orchestrate one or more service augmentation platforms on network edge servers based on identifying planned (e.g., scheduled) events where UE uses the 5G network to access cloud-based service from a specified location (e.g., gaming competitions, sporting events, conventions, etc.), and granting UE access to a network slice for the service augmentation platforms based on their geographic proximity to the location associated with the scheduled events. Users using the UE at the event may elect to utilize the service augmentation platform while they are within an area defined around the event (e.g., a geofence), and the UE realizes improvements in latency because one or more cloud-based applications and/or network functions have been moved from a data network and/or the 5G core network to the localized service augmentation platform.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
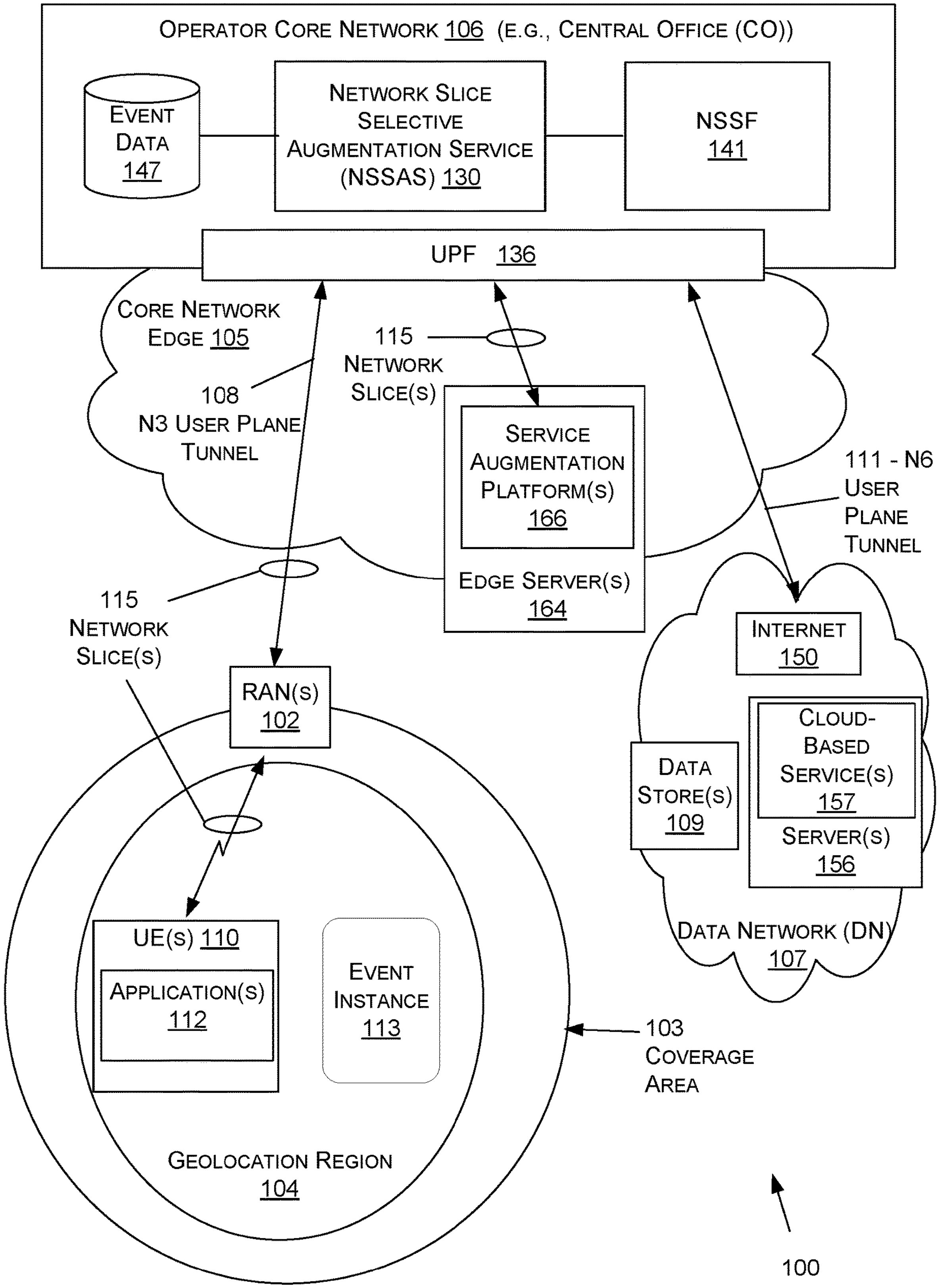
FIG. 1 is a diagram illustrating an example network environment for a telecommunications network, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

One or more of the embodiments presented in the disclosure provide for, among other things, systems and methods for geolocation-based network slice allocations for dynamic edge computing resource management. The embodiments presented in the disclosure provide network functionality for telecommunications network operators to provide premium services to users to access cloud-based services. The quality of user experiences associated with using cloud-based services is often a function of the network latency and data throughput capability of network elements along the communications path between a user's user equipment (UE) and the network-connected servers offering the cloud-based services. For example, for cloud-based services that involve applications such as gaming and/or remotely controlled machinery (e.g., aerial drones and/or other remotely piloted vehicles), delays in communicating control or telemetry data can have a substantial detrimental impact with respect to successfully completing one or more goals associated with accessing the cloud-based services.

A 5G network slice is a telecommunications network configuration that establishes multiple independent virtualized networks on the common physical infrastructure of a 5G network operator core. For each network slice instance, associated network functions can be orchestrated as needed to support the specific needs and/or use case of the customer using the network slice. Network resources allocated to a network slice may be tailored to customize parameters such as bandwidth, speed, and latency. A network slice may be established for a customer by the 5G network operator as a service that essentially provides the customer with a private end-to-end networking solution that includes complete logical isolation from other slices operating on the same physical infrastructure elements of the 5G network operator core and through common access networks (e.g., radio access networks). Currently, user equipment (UE) operating on a cellular network, such as a 5G stand-alone (SA) network, may be configured to operate on one or more network slices based on a subscription policy associated with the UE, and may be allocated those network slices based on Quality-of-Service (QoS) specifications. As such, allocating to the UE a high QoS network slice (e.g., a low-latency slice) for accessing a cloud-based service may eliminate one or more causes of network congestion that contribute to latency, enhancing the user experience in terms of both reliability and responsiveness. However, network slices still operate on a network architecture of physical infrastructure elements that may be susceptible to equipment failures and outages that affect the network slices. Moreover, allocating a network slice to a UE for accessing a cloud-based service may not address data transport delays caused by extended distances between the UE and the servers providing the cloud-based service.

Edge computing is an example of a technology that addresses latency and network reliability issues by locating servers that host the cloud-based services on network nodes at the network edge of the 5G network, in close proximity to UE that will use the cloud-based services via the 5G network (e.g., within a given network device hop count). However, in many circumstances it may be difficult for an operator of the cloud-based services and/or the operator of the 5G network to predict which network nodes on the network edge the cloud-based services are optimally located to host the cloud-based services—potentially leading to relying on multiple instances of network nodes to host the cloud-based services to ensure the cloud-based services are hosted by a network node on the network edge near UEs that are using the cloud-based services. However, instantiating and maintaining virtual servers on network edge nodes to host the cloud-based services from the network edge is very costly with respect to network resource commitments.

As opposed to existing technologies, one or more of the embodiments described herein, among other things, provide systems and methods that may orchestrate one or more service augmentation platforms on network edge servers based on identifying planned (e.g., scheduled) events where one or more UE use the 5G network to access cloud-based service from a specified location (e.g., gaming competitions, sporting events, conventions, etc.), and grant UE access to a network slice for the service augmentation platforms based on their geographic proximity to the location associated with the scheduled events.

In some embodiments, the operator core network for a telecommunications network may execute a network function referred to herein as a network slice selective augmentation service (NSSAS), which may be hosted by a network server of the operator core network. The NSSAS represents a resource coordinator that may maintain a database of event data that represents information about events taking place within a geographical area. For example, the event data may include information about an event such as one or more of an event identifier (event ID), an event name, an event type, event location data (e.g., geolocation data), and a scheduled date, starting time, and scheduled duration of the event. As an example, the event data may include a record for a convention scheduled to take place at a specified convention center over a scheduled time period. The NSSAS operates to discover when events within a defined area are scheduled, and understand the type of usage of the 5G network that may occur during the event. Based on the schedule, event location, and type of network usage, the NSSAS may instantiate network resources in the form of a service augmentation platform hosted by an edge network node (e.g., an edge network server) at locations on the network edge within close proximity to the location of the event on an as-needed basis. Once the event has ended, the NSSAS may decommission the service augmentation platform—freeing the associated network resources for other uses. Users using the UE at the event may elect to utilize the service augmentation platform while they are within an area defined around the event (e.g., a geo-fence) and the UE realizes improvements in latency because one or more cloud-based applications and/or network functions have been moved from a data network and/or the 5G core network to the localized service augmentation platform.

Moreover, UE access to the service augmentation platform may be regulated by the NSSAS through a combination of utilizing network slices and monitoring the location around the event for the presence of UE during the scheduled time of the event. For example, once the NSSAS has instantiated the service augmentation platform for the event, the NSSAS may begin to monitor when UE enter a geo-fence established for the event. When the location of a UE is identified as being within the geo-fence, the NSSAS may push a notification to the UE indicating that the user has the premium service option to access the service augmentation platform to obtain a higher quality of service while they attend the event—and any terms associated with the premium service, such as fees. The user may input into the UE their acceptance of the option. An indication of the acceptance may be communicated in a message from the UE to the NSSAS. In some embodiments a user may need to input an authentication to the UE to accept the option (e.g., a biometric authentication such as a fingerprint and/or face scan, or a password or passkey). The UE may then generate a token representing the user's authorization, which is transmitted via the network to the NSSAS. In response to receiving the authentication, the NSSAS may coordinate with one or more other network functions (as discussed below) to allocate and/or instantiate a network slice to carry network traffic between the UE and the service augmentation platform so that the UE may access one or more functions and/or services related to the event from the edge network node hosted service augmentation platform. For example, in some embodiments, upon receiving from the UE the authorization to elect the premium service option to access the service augmentation platform, the NSSAS may trigger the UE to request a network slice allocation from the operator core network (e.g., from the network slice selection function (NSSF)). The NSSAS may transmit to the UE a network slice identifier associated with the service augmentation platform and trigger the UE to transmit a packet data unit (PDU) modification request to the operator core network requesting allocation of a network slice based on the network slice identifier provided by the NSSAS. Then, based on the PDU modification request, the network operator core may grant the UE access to the service augmentation platform by allocating the network slice to the UE. For example, the operator core network may notify one or more network base stations (e.g., radio access network (RAN)) covering the area of the event to instruct the authorized UE to access the network slice to obtain access to the service augmentation platform. Once the event has ended, the NSSAS may decommission the network slice, and the UE may return to their previous network connectivity configuration. For example, the NSSAS may trigger the UE to transmit a PDU modification request to the operator core network requesting the return to a network connectivity configuration based on the UE's baseline subscription profile.

In other words, in some embodiments, UE access to the service augmentation platform is available to UEs that have been allocated the appropriate network slice coordinated by the NSSAS. Access to service augmentation platform is otherwise not accessible to UE at the event that have not been allocated a network slice by the NSSAS. Those UE that do not elect the premium service option, or otherwise fail the authentication process, may continue to access the one or more cloud-based applications for the event via the telecommunications network, for example, by accessing the one or more cloud-based applications from the standard data network host server (e.g., via the Internet) based on the terms of the UE's baseline service subscription.

FIG. 1 is a diagram illustrating an example network environment 100 embodiment for a wireless communication system suitable for implementing embodiments of the present disclosure. Network environment 100 is but one example of a suitable telecommunications network and is not intended to suggest any limitation as to the scope of use or functionality of the embodiments disclosed herein. Nor should the network environment be interpreted as having any dependency or requirement relating to any one or combination of components illustrated.

As shown in FIG. 1, network environment 100 comprises an operator core network 106 (also referred to as a "core network") that provides one or more network services to one or more UEs 110 (e.g., 3GPP UE) via at least one access network, such as radio access network (RAN) 102. In some embodiments, network environment 100 comprises, at least in part, a wireless communications network, such as, but not limited to, a 5G wireless communications network.

In some embodiments, the network environment 100 comprises one or more radio access networks (RANs) 102, which may be referred to in the context of a wireless telecommunications network as a wireless base station, cell site, or cellular base station. A RAN 102 may represent at least one wireless base station coupled to an operator core network to establish one or more communication links between the operator core network 106 and a user equipment (UE) 110. Each RAN 102 may provide wireless connectivity access to one or more UEs (such as UE 110) operating within a coverage area 103 associated with that RAN 102. The RAN 102 may implement wireless connectivity using, for example, 3GPP technologies. The RAN 102 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the RAN 102 may comprise, at least in part, components of a customer premises network, such as a distributed antenna system (DAS), for example. In the embodiments described herein, the one or more RANs 102 may establish a coverage area 103 that covers a geolocation region 104 for an event instance 113. For example, the geolocation region 104 may correspond to a stadium, conference center, park, or other venue or facility where the event 113 is scheduled to take place. From within the geolocation region 104, the UE(s) 110 may use one or more cloud-based services 157 (e.g., server-hosted applications) relevant to attendees of the event 113.

Radio access network(s) 102 may comprise a multimodal network (for example, comprising one or more multimodal access devices) where multiple radios supporting different systems are integrated into the radio access network(s) 102. Such a multimodal access network may support a combination of 3GPP radio technologies (e.g., 4G, 5G, and/or 6G) and/or non-3GPP radio technologies (e.g., IEEE 802.11 (WiFi) and/or IEEE 802.15 (Bluetooth) access points). In some embodiments, the radio access network(s) 102 may comprise a terrestrial wireless communications base station and/or may be at least in part implemented as a space-based access network, such as a base station implemented by an Earth-orbiting satellite. Individual UE 110 may communicate with the operator core network 106 via the RAN 102 over one or both of uplink (UL) radio frequency (RF) signals and downlink (DL) radio frequency (RF) signals.

The radio access network(s) 102 may be coupled to the operator core network 106 via a core network edge 105 that comprises edge server network nodes and wired and/or wireless network connections that may further include wireless relays and/or repeaters. In some embodiments, the RAN 102 may be coupled to the operator core network 106 at least in part by a backhaul network such as the Internet or other public or private network infrastructure. Core network edge 105 may comprise one or more network nodes (e.g., servers) and/or other elements of the operator core network 106 that may define the boundary of the operator core network 106 and may serve as the architectural demarcation point where the operator core network 106 connects to other networks such as, but not limited to, RAN 102, the Internet 150, Data Network (DN) 107, and/or other third-party networks. In some embodiments, the network edge 105 may comprise one or more network nodes that include one or more edge servers 164. Edge server(s) 164 may provide, for example, edge-based services to UE 110 that may be accessed separately from services provided by network functions of the operator core network 106. For example, edge server(s) 164 may host databases, caches, microservices, ledgers, decentralized applications (e.g., DApps), and/or may perform data traffic monitoring, inspections, and/or aggregation for other network functions of the network environment 100. In some embodiments, one or more edge servers 164 may host one or more of the service augmentation platforms 166 described herein.

It should be understood that in some aspects, the network environment 100 may not comprise a distinct operator core network 106, but rather may implement one or more features of the operator core network 106 within other portions of the network, or may not implement them at all, depending on various carrier preferences.

As shown in FIG. 1, network environment 100 may also comprise at least one data network (DN) 107 coupled to the operator core network 106 (e.g., via the network edge 105). In some embodiments, DN 107 may at least in part comprise the Internet 150. Data network 107 may include one or more data stores 109 and/or one or more servers 156 that host server applications such as one or more of the cloud-based services 157 for event 113. In some embodiments, UE 110 may access services and/or content provided by the data store(s) 109 and/or server(s) 156 of DN 107.

Generally, an individual UE 110 may comprise a device capable of unidirectional or bidirectional communication with the operator core network 106 via wireless and/or wired communication links. The network environment 100 may be configured for wirelessly connecting UEs 110 to other UEs 110 via the same access networks (e.g., RANs 102), via other access networks, via other telecommunication networks, and/or to connect UEs 110 to a public switched telecommunication network (PSTN). The network environment 100 may be generally configured, in some embodiments, for connecting UE 110 to data, content, and/or services that may be accessible from one or more application servers or other functions, nodes, or servers.

In allocating network resources and access to these data or services, the operator core network 106 may instantiate one or more network slices 115 and allocate one or more of those slice(s) 115 to carry network traffic for one or more applications 112 executed by processors of the UE 110. Within the context of the network slice(s) 115 as described herein, an individual UE 110 may function in the capacity of a subject entity that requests data and/or services from other networked elements (e.g., network functions and/or elements of DN 107) via network slice(s) 115 and/or a resource entity that provides data and/or services to other networked elements (e.g., network functions and/or elements of DN 107) via network slice(s) 115.

UE(s) 110 are in general forms of equipment and machines such as, but not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may include computing devices such as, but not limited to, handheld personal computing devices, cellular phones, smart phones, tablets, laptops, and similar consumer equipment, or stationary desktop computing devices, workstations, servers, and/or network infrastructure equipment. As such, the UE 110 may include both mobile UE and stationary UE. A UE 110 can include one or more processors and one or more non-transient computer-readable media for executing code to carry out the functions of the UE 110 described herein. The computer-readable media may include computer-readable instructions executable by the one or more processors. In some embodiments, the UE 110 and/or edge sever(s) 164 may be implemented using a computing device 600, as discussed below with respect to FIG. 6.

As shown in FIG. 1, the user plane function (UPF) 136 represents at least one function of the operator core network 106 that may extend into the core network edge 105. In some embodiments, the RAN 102 is coupled to the UPF 136 within the core network edge 105 by a communication link that includes an N3 user plane tunnel 108. For example, the N3 user plane tunnel 108 may connect a cell site router of the RAN 102 to an N3 interface of the UPF 136. The data store(s) 109, server(s) 156 and/or other elements of DN 107 may be coupled to the UPF 136 in the core network edge 105 by an N6 user plane tunnel 111. For example, the N6 user plane tunnel 111 may connect a network interface (e.g., a switch, router, and/or gateway) of the DN 107 to an N6 interface of the UPF 136. In some embodiments, the operator core network 106 may comprise a plurality of UPFs 136, such as a UPF at the operator core network 106 and a UPF at the core network edge 105. For example, a UPF at the core network edge 105 may be used for local breakout and/or low-latency types of applications via an N9 interface between the distinct UPFs.

When a UE 110 enters the coverage area, it may connect with the RAN(s) 102, authenticate to the operator core network 106, and gain access to services of the operator core network 106 based on a subscription policy associated with that UE 110. For example, in some embodiments, the UE 110 may comprise at least one application 112 that establishes one or more PDU sessions with the cloud-based service(s) 157 through the UPF 136. The cloud-based service(s) 157 may comprise one or more applications associated with the event instance 113. For example, the cloud-based service(s) 157 may comprise streaming content, two-way video/multimedia conferencing services, catalogs and/or access to other databases, messaging applications, real-time gaming applications, and/or other content or services. Using the baseline subscription policy associated with the UE 110, the PDU session between the application(s) 112 and the cloud-based service(s) 157 may traverse a transport path through the operator core network 106 (e.g., through the UPF 136), the DN 107, Internet 150, and/or one or more other network elements to connect with the servers 156 hosting the cloud-based service(s) 157. As such, the latency, throughput, and/or reliability of that data path between the applications 112 and the cloud-based service(s) 157 is a cumulative function of the latency, throughput, and/or reliability of each individual network element that forms a link in that path, as well as the resulting cumulative network device hop count.

As discussed herein, embodiments of this disclosure, among other things, establish a network slice selective augmentation service (NSSAS) 130, which may be hosted as a network function of the operator core network 106 to function as a resource coordinator for instantiating service augmentation platforms 166 and manage access to those service augmentation platforms 166 through the selective allocation of network slices 115 that are tailored to provide UE 110 within the geolocation region 104 with access to the service augmentation platforms 166. A service augmentation platform 166 may comprise a set of applications and network functions hosted by one or more edge servers 164 at locations on the core network edge 105 within a close proximity (e.g., based on network device hops or other metric) to the RAN(s) 102 providing service to the UE 110 at the event instance 113. As described in greater detail with respect to FIG. 3, in some embodiments, the service augmentation platform 166 may comprise applications that duplicate or otherwise substitute for one or more of the applications of the cloud-based event service(s) 157—from a network node in substantially closer proximity to the UE 110 than the content-services servers 156 of DN 107. Moreover, in some embodiments, the NSSAS 130 may control the service augmentation platform 166 to instantiate one or more localized instances of network functions of the operator core network 106 to increase the speed and efficiency of providing services of those core network functions to those UE 110 that elect to use the premium services of the service augmentation platform 166—as well as relieving the operator core network 106 of at least some of the burdens on network resources associated with network traffic associated with the event instance 113.

In some embodiments, the NSSAS 130 generates and maintains a database of event data 147 comprising information about events, such as event instance 113, scheduled to occur—for example, within a designated geographic area such as a metropolitan area, city, or town. For example, the NSSAS 130 may search public records and/or announcements from one or more online databases and/or websites that publish event information, and identify from that event information event instances that are occurring within the designated geographic area(s) relevant to that NSSAS 130.

Figure 3:
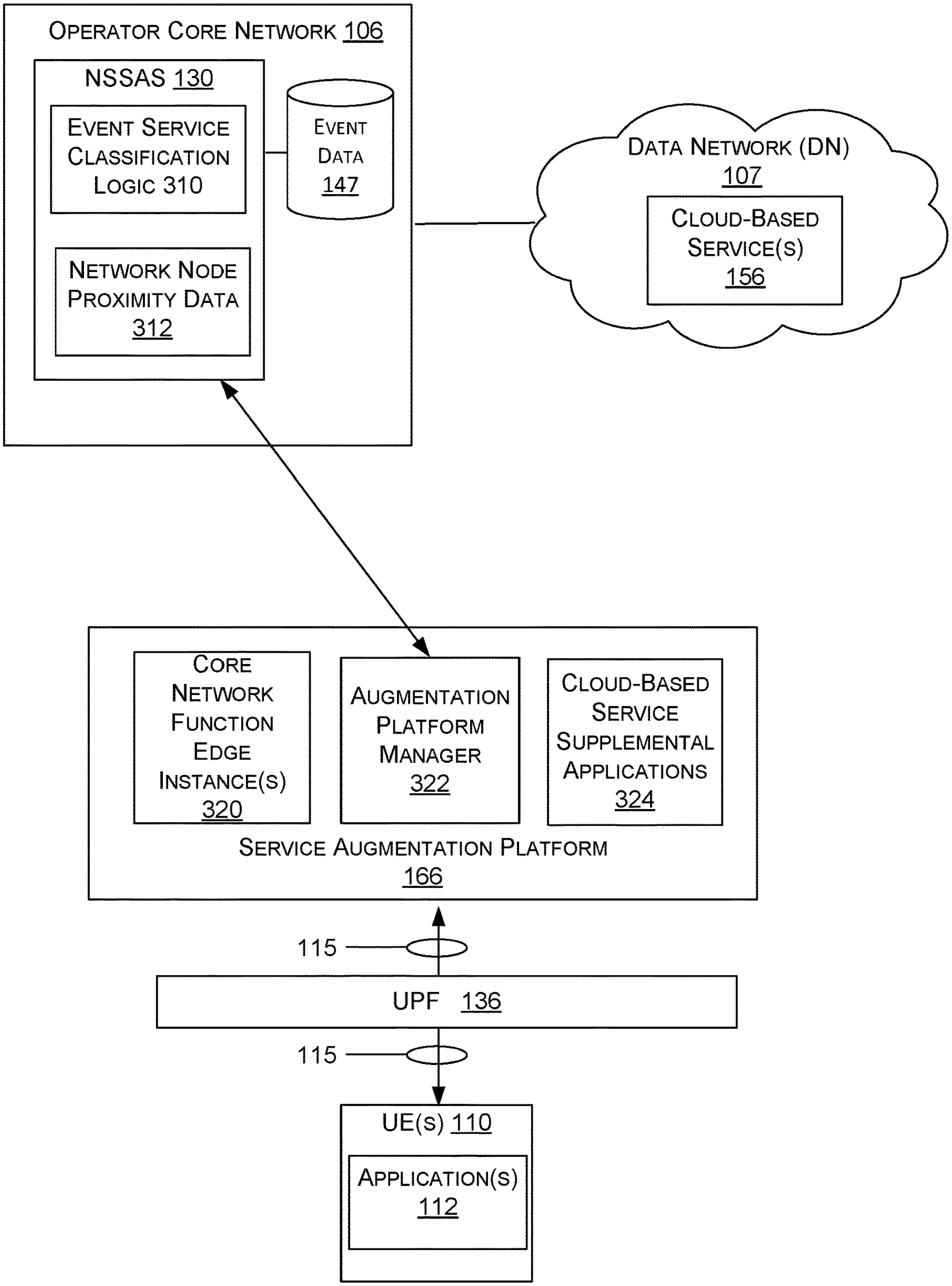
FIG. 3 is a diagram illustrating an example network slice selective augmentation service, in accordance with some embodiments described herein.
Figure 4:
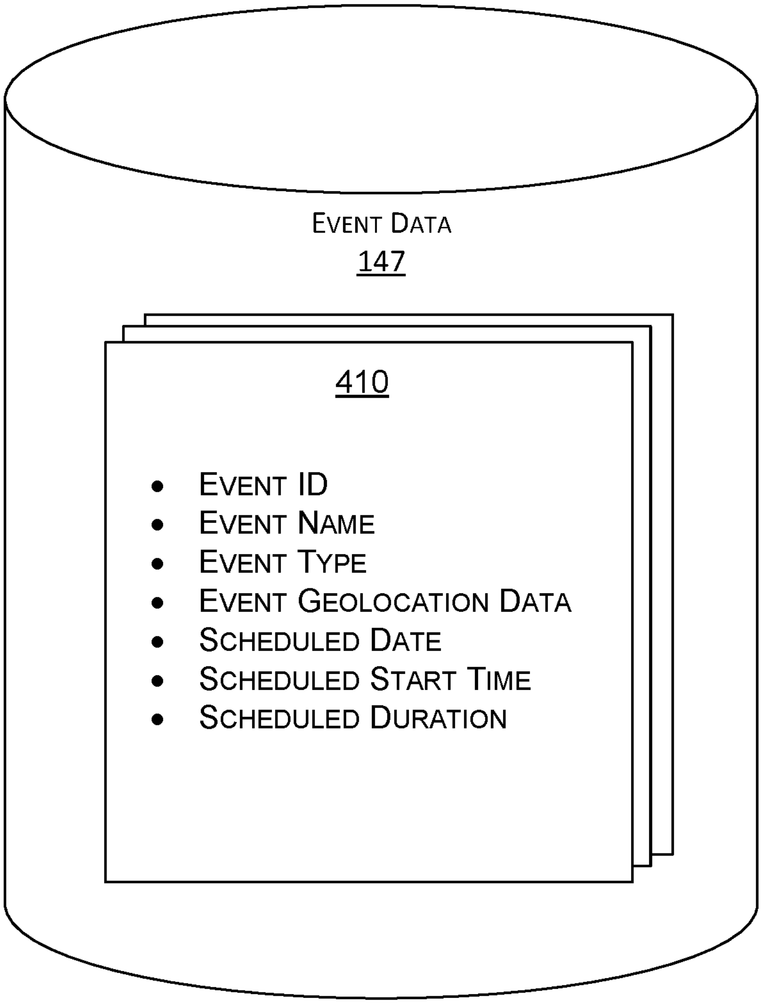
FIG. 4 is a diagram illustrating an example database comprising event data for a network slice selective augmentation service, in accordance with some embodiments described herein.

As an example, in some embodiments the NSSAS 130 may include event service classification logic 310, as illustrated in FIG. 3. The event service classification logic 310 may apply a natural language processing (NLP) algorithm to published event information it may access from online resources and generate data records for events based on the published event information. As an example, as illustrated in FIG. 4, the event data 147 may include one or more records, including a record 410 for a scheduled event to take place at a specified location over a scheduled time period. The record 410 for an event may include, for example, an event name and/or other event identifier (ID), an event description, event location data (e.g., geolocation data), scheduling data (e.g., date(s), start time, end time and/or duration), and/or other information.

In some embodiments, the event service classification logic 310 may further evaluate the event description and/or other data to classify the event to apply a network service classification. For example, in some embodiments, the event service classification logic 310 may apply a keyword search to associate the event with a network classification based on the event description and/or the location data (e.g., based on characteristics of the venue hosting the event). For example, the event service classification logic 310 may infer the type of network traffic that will be used by participants and/or attendees based on the event description. In some embodiments, the event service classification logic 310 may sample network utilization data associated with the cloud-based service(s) 157 and assess one or more characteristics of network traffic associated with the cloud-based service(s) 157, and apply that data to a machine learning model (e.g., an artificial intelligence inference engine) trained as an inference engine to predict a network service classification based on a classification of network traffic. The network service classification may be correlated against a set of available network slices supported by the UE 110 to select an available network slice that supports the type of traffic associated with the cloud-based service(s) 157.

Based on the network classification determined by the event service classification logic 310, the NSSAS 130 may determine what set of resources are to be instantiated at the service augmentation platform that may deliver a higher QoS to UE 110 in attendance at the event instance 113, which may be offered as a premium serious option to those UE 110. The network classification may comprise a multi-class classification that indicates characteristics of expected network usage such as, for example, both a type of network traffic (e.g., text, voice, data, streaming, multimedia, telemeter, control signals, low-latency data, etc.) and/or an expected volume of data traffic that will be generated by the many UEs 110 at the event. As an example, an event identified as a competition between remote piloted vehicles, or a gaming competition, may be classified with a network classification indicating that the event will utilized by multiple UE 110 for low-latency, high-bandwidth network connections. For example, UE 110 may comprise the controlled vehicles and/or the controllers in the context of such an event. Another event may be identified as a convention for smart consumer products (e.g., IoT devices) where UE 110 will be accessing small to moderate bursts of data from backend servers, and the NSSAS 130 assigns a medium-latency, medium-network traffic network classification. In some embodiments, the event service classification logic 310 may use natural language processing (NLP) in the form of a natural language model (e.g., an artificial intelligence/machine learning model) to infer (e.g., predict) a network service classification for the event from the event information the NSSAS 130 has collected about the event. The NSSAS 130 event record 410 in the event data 147 for that event instance may be updated to include the network service classification.

In some embodiments, based on a physical address (or other location data) of an event instance 113, the NSSAS 130 may determine which RAN(s) 102 are nearby and produce a coverage area 103 that covers the location of the event instance 113, and may determine which edge server(s) 164 are in close proximity to those RAN(s) 102. The notion of proximity with respect to the proximity of edge server(s) 164 and the RAN(s) 102 may refer to a network device hop count, a physical distance, and/or other characteristic(s) of the network infrastructure that may affect the amount of time it takes for network traffic to traverse the path from one to the other. Accordingly, in some embodiments, as illustrated with reference to FIG. 3, the NSSAS 130 may comprise or otherwise have access to network node proximity data 312. For example, the NSSAS 130 may refer to network node proximity data 312 to reference a map of RAN(s) (e.g., base stations, gNodeBs, etc.) that service the operator core network 106, and may also refer to network node proximity data 312 to reference the locations of edge server(s) 164. The NSSAS 130 may search the network node proximity data 312 to identify one or more edge servers 164 on the core network edge 105 that are within a threshold proximity to the RAN(s) 102 covering the event instance 113 and may select one or more of those edge servers 164 for instantiation of a service augmentation platform 166. In some embodiments, the service augmentation platform 166 may be maintained for the duration of the event, and then decommissioned. In some embodiments, the threshold proximity may be selected based, for example, on projected network traffic latencies.

Based on the starting time of the event instance 113 as indicated in the event data 147, the NSSAS 130 may begin to monitor for UE 110 activity within the coverage area 103 and identify UE 110 that are located within the geolocation region 104. For example, the NSSAS 130 may query the RAN(s) 110 to report the presence of UE 110 within a cell sector of a cell of the RAN(s) 110 that corresponds with the geolocation region 104, may determine a UE 110 location based on triangulation of signals from UE 110 between multiple RAN(s) 110, and/or may query the UE 110 to report localization data (e.g., based on an internal Global Navigation Satellite System (GNSS) receiver, such as a Global Positioning System (GPS) receiver).

The NSSAS 130 may instruct the RAN(s) 110 to send a message to those UE 110 identified as being located within the geolocation region 104 (after the start, but before the end, of the event instance 113), providing an alert (e.g., a Short Message/Messaging Service (SMS) message, application notification, pop-up message, or similar notification) on the UE 110 informing the user of their option to subscribe to the premium service option to obtain a higher quality of service while they attend the event—and any terms associated with electing the premium service, such as fees. The NSSAS 130 may instruct the RAN(s) 102 for the coverage area 103 to only broadcast those premium option messages during the time of the event and to only accept responses electing the premium service from UE 110 within the geolocation region 104. If the user accepts the offer, the user may input into the UE 110 their acceptance of the option. An indication of the acceptance may then be communicated in a message from the UE 110 to the NSSAS 130. For example, the UE 110 may then generate a token representing the user's authorization, which is transmitted via the network to the NSSAS 130. In response to receiving the authentication, the NSSAS 130 may coordinate with the NSSF 141 and/or other network functions to allocate and/or instantiate a network slice 115 to carry network traffic between the UE 110 and the service augmentation platform 166. By accessing the service augmentation platform 166, the UE 110 may access one or more applications, functions, and/or services that may enhance, duplicate, or otherwise supplement cloud-based service(s) 157 associated with the event instance 113.

Upon receiving from the UE 110 an authorization to elect the premium service option to access the service augmentation platform 166, the NSSAS 130 may trigger the UE 110 to request a network slice 115 allocation from the operator core network (e.g., from the network slice selection function (NSSF)). For example, the NSSAS 130 may transmit to the UE 110 a network slice identifier associated with the service augmentation platform 166 and trigger the UE 110 to transmit a packet data unit (PDU) modification request to the operator core network 106 (e.g., to the NSSF 141) to request allocation of a network slice 115 based on the network slice identifier provided by the NSSAS 130. In some embodiments, the slice identifier may be based in part on a preselected 3GPP Slice identifier—such as a Slice/Service Type (SST) and/or service differentiator (SD) of a Single Network Slice Selection Assistance Information (S-NSSAI), and/or may be predefined for certain types of traffic associated with a service augmentation platform 166, for example. Then, based on the PDU modification request, the NSSF 141 may grant the UE 110 access to the service augmentation platform 166 by allocating the network slice 115 to the UE 110. When the NSSAS 130 determines that the event instance 113 has finished (e.g., based on the event data 147), the NSSAS 130 may similarly trigger UE 110 to transmit a PDU modification request to relinquish the slice 115; access to the slice 115 by the UE 110 may be deallocated by the NSSF 141; and the NSSAS 130 may break down the service augmentation platform 166 at the edge server(s) 164.

Figure 2:
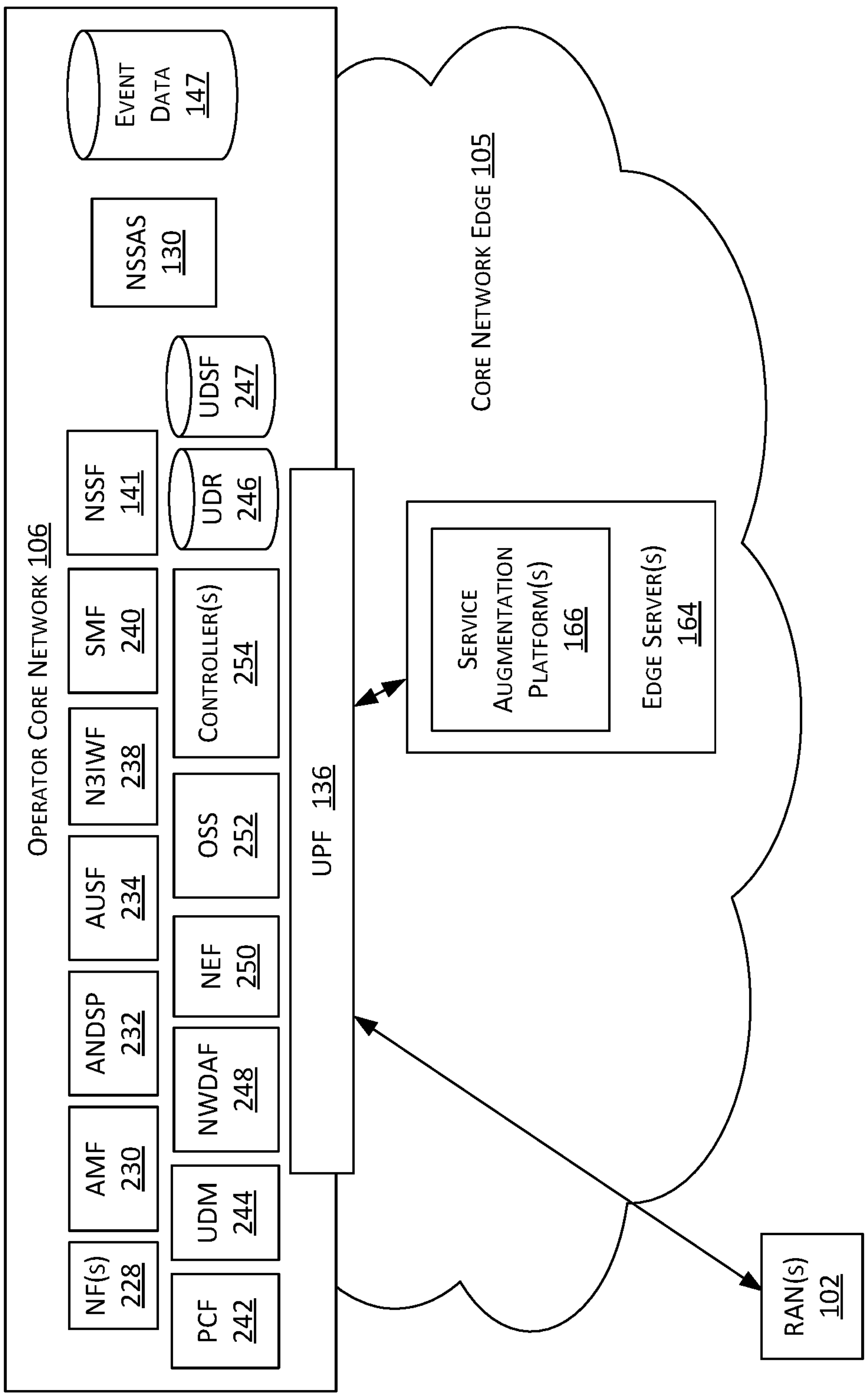
FIG. 2 is a diagram illustrating an example operator core network for a telecommunications network implementing a network slice selective augmentation service, in accordance with some embodiments described herein.

Referring now to FIG. 2, in some implementations, the operator core network 106 may comprise modules, also referred to as network functions (NFs), implemented by one or more processors and generally represented in FIG. 2 as NF(s) 228. Individual network functions that are distinctly illustrated in FIG. 1 may include, but are not limited to, one or more of a core access and mobility management function (AMF) 230, an access network discovery and selection policy (ANDSP) 232, an authentication server function (AUSF) 234, the user plane function (UPF) 136, non-3GPP interworking function (N3IWF) 238, a session management function (SMF) 240, the network slice selection function (NSSF) 141, a policy control function (PCF) 242, unified data management (UDM) 244, a unified data repository (UDR) 246, an unstructured data storage function (UDSF) 247, a network data analytics function (NWDAF) 248, a network exposure function (NEF) 250, and an operations support system (OSS) 252. Implementation of these NFs of the operator core network 106 may be executed by one or more controllers 254 on which these network functions are orchestrated or otherwise configured to execute utilizing processors and memory of the one or more controllers 254. The NFs and/or one or more elements of the service augmentation platform 166 may be implemented as physical and/or virtual network functions, container network functions, and/or cloud-native network functions, such as is described with respect to FIG. 6. Within the context of network slice(s) 115 created by the operator core network 106, the operator core network 106 may orchestrate individual dedicated instances of one or more of the network functions described herein to establish and support operation of a network slice 115.

Notably, the nomenclature used herein is used primarily with respect to the 3GPP 5G architecture. In other aspects, one or more of the network functions of the operator core network 106 may take different forms, including consolidated or distributed forms that perform the same general operations. For example, the AMF 230 in the 3GPP 5G architecture is configured for various functions relating to security and access management and authorization, including registration management, connection management, paging, and mobility management. In other forms, such as a 4G architecture, the AMF 230 of FIG. 2 may take the form of a mobility management entity (MME). The operator core network 106 may be generally said to authorize rights to and facilitate access to an application server/service, such as provided by application function(s) requested by one or more UEs, such as UE 110. In some embodiments, the NSSF 141 works in conjunction with the AMF 230 to establish network slice instances of network slice(s) 115, such as is described herein. That is, based on a request from the UE 110 (e.g., a PDU session modification request) that is triggered by the NSSAS 130, the NSSF 141 may work in conjunction with the AMF 230 to establish and/or allocate a network slice 115 to the UE 110 that provides UE 110 with access to the services of the service augmentation platform 166.

Returning to FIG. 2, The AMF 230 facilitates mobility management, registration management, and connection management for 3GPP devices, such as a UE 110. ANDSP 232 facilitates mobility management, registration management, and connection management for non-3GPP devices (e.g., devices that connect via the N3IWF 238). AUSF 234 may receive authentication requests from the AMF 230 and interact with UDM 244, for example, for SIM authentication and/or to authenticate a UE 110 based on a device identification (ID). N3IWF 238 provides a secure gateway for non-3GPP network access, which may be used for providing connections for UE 110 access to the operator core network 106 over a non-3GPP access network (e.g., via a data link established between a customer premise gateway and the N3IWF 238).

SMF module 240 facilitates initial creation of protocol data unit (PDU) sessions with UE 110 using session establishment procedures. The PCF 242 maintains and applies policy control decisions and subscription information. Additionally, in some aspects, the PCF 242 maintains quality of service (QoS) policy rules. For example, the QoS rules stored in a unified data repository (UDR) 246 can identify a set of access permissions, resource allocations, or any other QoS policy established by an operator. The Unstructured Data Storage Function (UDSF) 247 may store dynamic state data, which is structured and unstructured data related to network function of the operator core network 106. That is, the UDSF 247 may support storage and retrieval of structured and/or unstructured data by other network functions 228 of the operator core network 106, including information relating to access control and service and/or microservice subscriptions.

In some embodiments, the PCF 242 maintains subscription information indicating one or more services and/or microservices subscribed to by each UE 110. In some embodiments, a PCF 242 instance may maintain subscription information pertaining to UE 110 authorized to access services from within a network slice 115, such as the service augmentation platform 166 instantiated on edge server(s) 164. The UDM 244 manages network user data including, but not limited to, data storage management, subscription management, policy control, and core network 106 exposure. NWDAF 248 collects data (for example, from UE; other network functions; application functions; and operations, administration, and maintenance (OAM) systems) that can be used for network data analytics. The OSS 252 is responsible for the management and orchestration of one or more elements of the operator core network 106 and the various physical, virtual network functions, container network functions, controllers, computer nodes, and other elements that implement the operator core network 106.

Some aspects of network environment 100 and/or operator core network 106 include the UDR 246 storing information relating to access control and service and/or microservice subscriptions. The UDR 246 may be configured to store information relating to such subscriber information and may be accessible by multiple different network functions (NFs) 228 in order to perform desirable functions. For example, the UDR 246 may be accessed by the AMF 230 in order to determine subscriber information pertaining to the UE 110 (e.g., which network slices the UE 110 is subscribed to use), accessed by a PCF 242 to obtain policy-related data, and/or accessed by NEF 250 to obtain data that is permitted for exposure to third-party applications (such as applications 112 executed by UE 110, for example). Other functions of the NEF 250 include monitoring of UE-related events and posting information about those events for use by external entities, providing an interface for provisioning UEs 110 (e.g., via PCF 242), and reporting provisioning events to the UDR 246. Although depicted as a unified data management module, UDR 246 can be implemented as a plurality of network function specific data management modules. As mentioned above, in the context of a network slice 115, the operator core network 106 may orchestrate individual instances of each of these network functions and other such network functions described herein that are dedicated to the network slice 115.

The UPF 136 is generally configured to facilitate user plane operation relating to packet routing and forwarding, interconnection to a data network (e.g., DN 107), policy enforcement, and data buffering, among other operations. Using network slicing (e.g., based on 5G software-defined networking managed by the 5G network slice selection function (NSSF) 141), the UPF 136 may establish a dedicated slice network function for one or more data channels between various network functions and other entities that act as, in essence, a distinct network (for example, establishing its own QoS, provisioning, and/or security) within the same physical network architecture of network environment 100. As explained herein, the NSSF 141, either alone or in conjunction with other network functions of the operator core network 106, may function as a slice coordination network function to control the operator core network 106 to orchestrate individual dedicated instances of one or more of the network functions described herein to establish and support operation of network slices allocated to the UE 110 based on network slice allocation requests from the UE 110 triggered by the NSSAS 130. A network slice type may be used to identify service characteristics of a network slice 115, and at least in part may define the configuration of the slice network functions that make up that network slice. For example, in different implementations, a UE 110 may be assigned a network slice 115 (e.g., for use by application(s) 112) such as an Enhanced Mobile Broadband (eMBB) network slice, a Massive Machine Type Communications (MMTC) network slice, an Ultra-Reliable Low-Latency Communication (URLLC) network slice, or a Public Safety (PS) network slice. A network slice instance, therefore, may comprise an instantiation of a specific network slice type.

Referring now to FIG. 3, FIG. 3 illustrates an example embodiment of an NSSAS 130 and service augmentation platform 166. As discussed herein and illustrated in FIG. 3, UE(s) 110 may communicate through the one or more network slices 115 to access one or more services of the service augmentation platform 166 (while within the geolocation region 104). The NSSAS 130, as previously discussed, may comprise event service classification logic 310 and/or network node proximity data 312—used to determine when and where on the core network edge 105 a service augmentation platform 166 should be substantiated during an event instance 113 to support the one or more UE 110 that elect access to premium services from the service augmentation platform 166.

In some embodiments, the service augmentation platform 166 comprises an augmentation platform manager 322 that is orchestrated on an edge server 164 by the NSSAS 130. Through the augmentation platform manager 322, the NSSAS 130 may orchestrate and control services and/or functions offered as premium services to the UE 110 that elected the premium service offer. For example, services and/or functions offered as premium services to the UE 110 may include one or both of cloud-based service supplemental applications 324 and/or one or more core network function edge instances. In some embodiments, such services and/or functions of the service augmentation platform 166 may be instantiated by the augmentation platform manager 322 in response to instructions (e.g., messages or other signals) from the NSSAS 130. In some embodiments, the cloud-based service supplemental applications 324 may comprise a mirror of the cloud-based service(s) 157 and/or otherwise comprise one or more applications that implement duplicate applications or functions from the cloud-based service(s) 157. For example, if the cloud-based service(s) 157 comprises applications that serve streaming video and/or multimedia data to UE 110, the cloud-based service supplemental applications 324 may comprise a mirror of one or more data stores that include that content data so that the content may be served to the UE 110 from the service augmentation platform 166 rather than from the DN 107 hosted cloud-based service(s) 157—thus providing the content from a data source closer in proximity to the RAN(s) 102 and therefore reducing latency. Similarly, if the cloud-based service(s) 157 comprises applications that perform complex processing of data received from UE 110 (e.g., cloud-based machine learning models and/or artificial intelligence platforms), execution of those applications may be moved from the servers of DN 107 to the service augmentation platform 166. The reduced latency achieved by moving the applications closer in proximity to the RAN(s) 102 may at least in part offset processing time needed to execute those complex processing operations. Similarly, in cases where the cloud-based service(s) 157 comprises applications that process interactions between UE 110 present for the event instance 113, moving those applications from servers on the DN 107 to the service augmentation platform 166 may substantially improve the throughput and latency of the interactions between those UE 110 because the applications are closer in proximity to the RAN(s) 102.

In some embodiments, the cloud-based service supplemental applications 324 may include one or more applications that supplement the applications provided by other services such as the cloud-based service(s) 157. For example, in some embodiments the cloud-based service supplemental applications 324 may implement a virtual private network (VPN) service to UE 110 within the geolocation region 104 that elect the premium service option for the event instance 113. That is, one of the service augmentations provided to UE 110 that access the service augmentation platform 166 may be the ability to access back-end servers (e.g., on the internet 150 and/or server(s) 156) through a secure and private VPN connection. For example, the UE 110 may have an application 112 comprising a VPN client, and the UE 110 may have a corresponding VPN profile installed. The UE 110 and/or its user may have already been identified as having access and permission to enter the geolocation region 104, and once the NSSAS 130 detects that the UE 110 is within the geolocation region 104, it triggers the UE 110 to request allocation of the network slice 115, and the UE 110 then may activate the VPN service provided by the service augmentation platform 166 implemented on edge server 164. In some embodiments, the VPN service or client application 112 may include one or more additional forms of authentication, such as a biometric authorization (e.g., a face and/or fingerprint scan), a SIM-based authentication, or other authentication methods.

In some embodiments, the NSSAS 130 may control the service augmentation platform 166 to also, or instead, orchestrate one or more core network function edge instances 320 of network functions of the operator core network 106. For example, in some embodiments, the core network function edge instances 320 may include a local edge-based instantiation of the UPF 136 (and/or other core network resources) dedicated to the transport of PDU session traffic for UE 110 that have elected the premium service option. Such local core network function edge instances 320 provided in close proximity to the RAN(s) 102 by the service augmentation platform 166 may streamline network operations for such UE 110 providing a premium user experience as well as shifting at least part of the core network 106 resource burden for supporting those UE 110 out of the operator core network 106 for at least the duration of the event instance 113—thus avoiding potential overutilization of operator core network 106 resources that could adversely affect network reliability and/or efficiencies.

Moreover, based on monitoring of network traffic through the RAN(s) 102 and/or network slices 115 serving UE 110 within the geolocation region 104, the NSSAS 130 may instruct the augmentation platform manager 322 to orchestrate additional (or fewer) processing resources from the edge server(s) 164 for executing the core network function edge instance(s) 320 and/or cloud-based service supplemental applications 324.

Once the event instance 113 has finished, the NSSAS 130 may instruct the augmentation platform manager 322 to decommission/de-orchestrate the service augmentation platform 166.

In some embodiments, as opposed to the NSSAS 130 sending a message to those UE 110 identified as being located within the geolocation region 104 during an event to offer access to the service augmentation platform 166, a UE 110 may be pre-subscribed (e.g., by their owner/user) through their service subscription with the operator to access service augmentation platforms 166 when a service augmentation platforms 166 is made available at an event instance 113. As such, in such implementations, when the NSSAS 130 detects that a pre-subscribed UE 110 is present within a geolocation region 104 during an event, the NSSAS 130 may proceed to trigger the UE 110 to request a network slice 115 for access to the service augmentation platforms 166.

The systems and methods described herein for geolocation-based network slice allocations for dynamic edge computing resource management thus benefits both the operation of UE 110 and/or the operator core network 106 by optimally leveraging edge computing resources and network slicing to reduce network latencies for the UE 110. Moreover, these embodiment described herein may shift at least part of the resource burden for supporting those UE 110 out of the operator core network 106 for at least the duration of the event instance 113 and/or otherwise provide for more efficient allocations of network resources.

Figure 5:
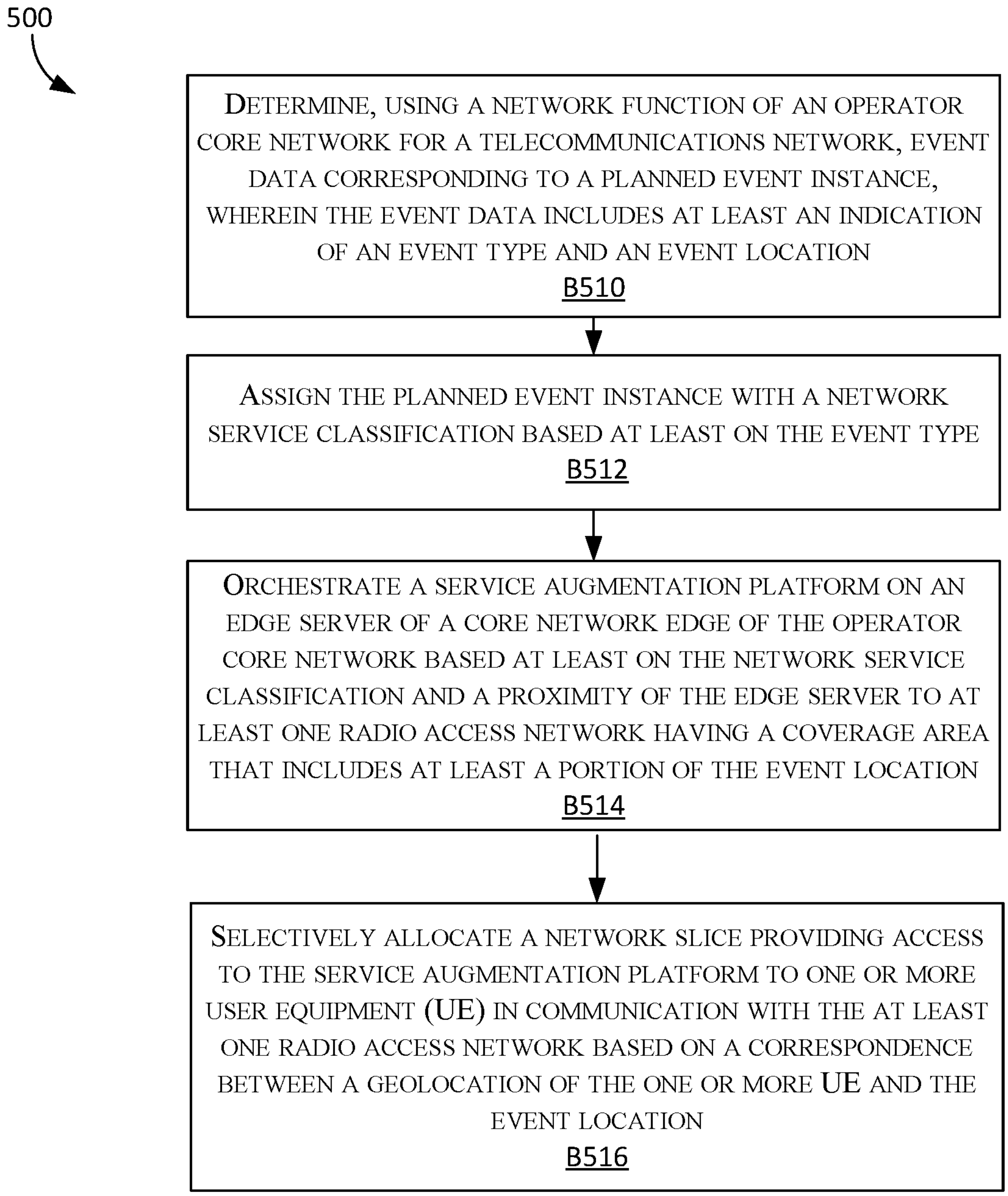
FIG. 5 is a flow chart illustrating an example method for a network slice selective augmentation service, in accordance with some embodiments described herein.

FIG. 5 is a flow chart illustrating a method 500 for dynamic edge computing resource management, according to some embodiments. It should be understood that the features and elements described herein with respect to the method of FIG. 5 may be used in conjunction with, in combination with, or substituted for elements of any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa. In some embodiments, elements of method 500 are implemented utilizing one or more processing units, such as the controller of an operator core network, an edge server, a RAN, a UE, and/or other processing units, as disclosed in any of the embodiments herein. In some embodiments, the method 500 may be implemented by components of a telecommunications network environment 100, such as illustrated by FIG. 1, such as but not limited to, the NSSAS 130 (e.g., by one or more operations of the NSSAS 130) and/or service augmentation platform(s) 166 (e.g., by one or more operations of the service augmentation platform(s) 166).

The method 500 at B510 includes determining, using a network function of an operator core network for a telecommunications network, event data corresponding to a planned event instance, wherein the event data includes at least an indication of an event type and an event location. For example, the event data may include information about an event such as one or more of an event identifier (event ID), an event name, an event type, event location data (e.g., geolocation data), and a scheduled date, starting time, and scheduled duration of the event. As an example, the event data may include a record for a convention scheduled to take place at a specified convention center over a scheduled time period. As discussed herein, the method may include an NSSAS network function discovering when events within a defined region are scheduled, and understand the type of usage of the telecommunications network that may occur during the event. The NSSAS may generate and maintain a database of event data comprising information about events, such as event instance 113, scheduled to occur—for example, within a designated geographic area such as a metropolitan area, city, or town. For example, the NSSAS may determine event data by searching public records and/or announcements from one or more online databases and/or websites that publish event information, and identify from that event information event instances that are occurring within one or more designated geographic areas.

The method 500 at B512 includes assigning the planned event instance with a network service classification based at least on the event type. As explained herein, in some embodiments, a network service classification may be determined from the event data based on at least one of: a machine learning model trained as an inference engine or a natural language processing (NLP) algorithm. For example, an event service classification logic may apply a natural language processing (NLP) algorithm to published event information it may access from online resources and generate data records for events based on the published event information. The event service classification logic may further evaluate the event description and/or other data to classify the event to apply a network service classification. The network service classification may be correlated against a set of available network slices supported by the UE to select an available network slice that supports the type of traffic associated with one or more cloud-based service(s) that are utilized by the UE during the event. The network classification may comprise a multiclass classification that indicates characteristics of expected network usage such as, for example, both a type of network traffic (e.g., text, voice, data, streaming, telemetry, control data multimedia, low-latency data) and/or an expected volume of data traffic that will be generated by the many UEs at the event.

The method 500 at B514 includes orchestrating a service augmentation platform on an edge server of a core network edge of the operator core network based at least on the network service classification and a proximity of the edge server to at least one radio access network having a coverage area that includes at least a portion of the event location. The proximity of the edge server to the at least one radio access network may be based on at least one of: a number of network device hops or a physical distance. The method may include instantiating, at the service augmentation platform, one or more instances of network functions of the operator core network based at least in part on the network service classification. The method may include instantiating, at the service augmentation platform, one or more instances of cloud-based service supplemental applications based at least in part on the network service classification, wherein the one or more instances of cloud-based service supplemental applications are associated with at least one cloud-based service accessible to the one or more UE via the at least one radio access network. As an example, the service augmentation platform may instantiate a virtual private network (VPN) service accessible to the one or more user equipment (UE).

The method 500 at B516 includes selectively allocating a network slice providing access to the service augmentation platform to one or more user equipment (UE) in communication with the at least one radio access network based on a correspondence between a geolocation of the one or more UE and the event location. In some embodiments, the network function (e.g., the NSSAS) may monitor for a presence of the one or more UE within a geolocation region associated with the event location. Based at least on detecting the presence, the network function may send a notification message to the one or more UE where the notifications displays an option to elect access to the service augmentation platform. Based on an authorization from the one or more UE in response to the notification message, the network function may trigger the one or more UE to transmit a request to the operator core network to allocate the network slice providing access to the service augmentation platform to the one or more UE. The request to the operator core network may comprise a packet data unit (PDU) modification request indicating a network slice identifier associated with the service augmentation platform. In some embodiments, the request to the operator core network comprises a network slice identifier provided to the one or more UE by the network function, the network slice identifier being associated with the service augmentation platform.

The method may include de-orchestrating the service augmentation platform based on a duration of the planned event instance indicated by the event data and/or deallocating the network slice providing access to the service augmentation platform based at least on one or more of: the one or more UE leaving a geolocation area associated with the event location, or a duration of the planned event instance indicated by the event data.

Figure 6:
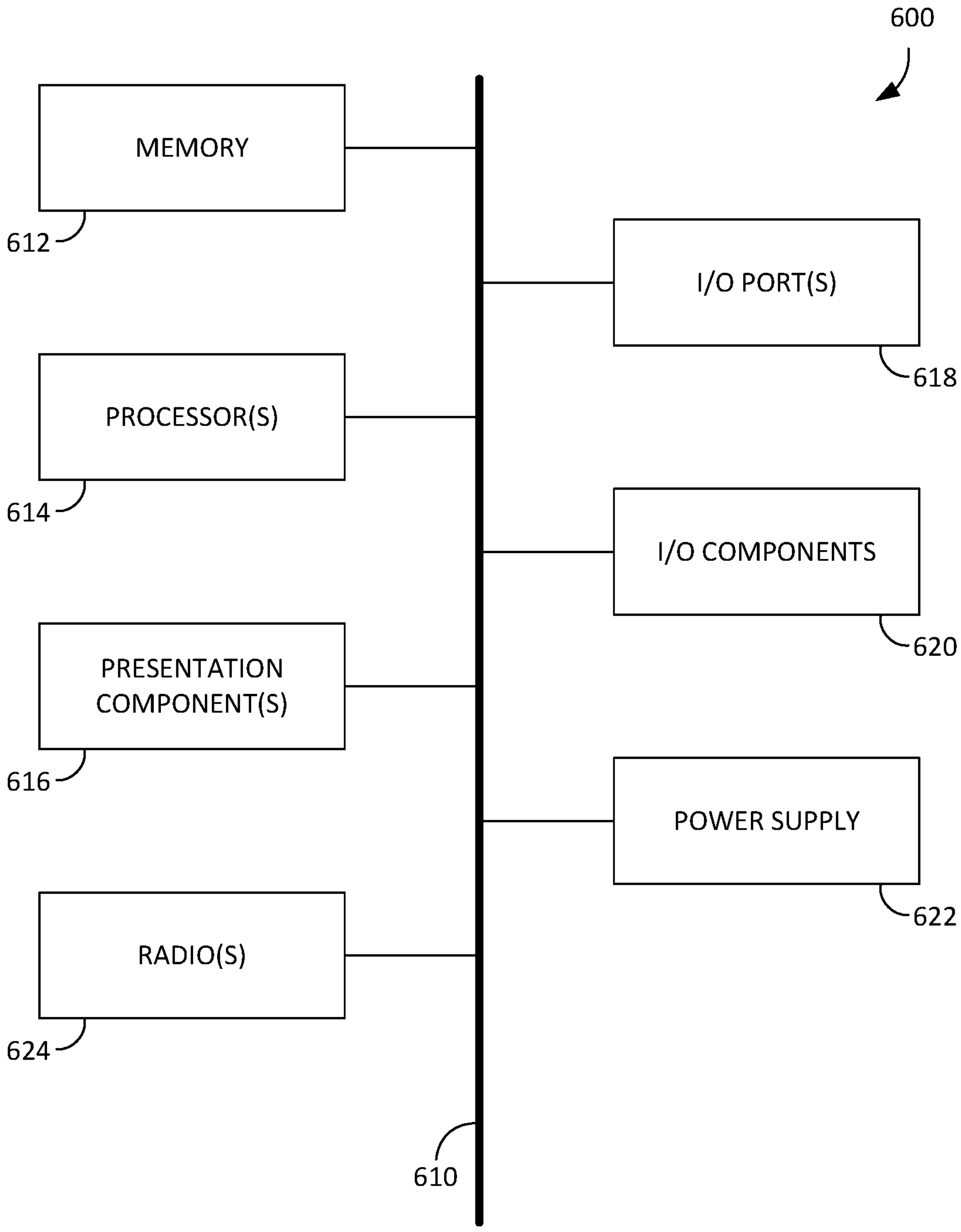
FIG. 6 is an example computing device, in accordance with some embodiments described herein.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the embodiments described herein, and nor should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 610 that directly or indirectly couples the following devices: memory 612, one or more processors 614, one or more presentation components 616, input/output (I/O) ports 618, I/O components 620, power supply 622, and radio 624. Bus 610 represents what may be one or more buses (such as an address bus, data bus, or combination thereof). The devices of FIG. 6 are shown with lines for the sake of clarity. However, it should be understood that the functions performed by one or more components of the computing device 600 may be combined or distributed amongst the various components. For example, a presentation component such as a display device may be one of I/O components 620. In some embodiments, one or more functions of a UE 110, an NSSAS 130 and/or service augmentation platform(s) 166 discussed herein may be executed at least in part by computing device 600. The processors 614 of computing device 600 may include a memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as “workstation,” “server,” “laptop,” “handheld device,” etc., as all are contemplated within the scope of FIG. 6 and refer to “computer” or “computing device.”

Computing device 600 typically includes a variety of computer-readable media. For example, applications NSSAS 130 and/or service augmentation platform(s) 166 may be stored in a memory comprising such computer-readable media. Computer-readable media can be any available media that can be accessed by computing device 600 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes non-transient RAM, ROM, EEPROM, flash memory or other memory technology, CD-ROM, digital versatile disks (DVDs) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or non-volatile memory. Memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. In some embodiments, one or more of the functions described herein of the NSSAS 130, service augmentation platform 166 and/or UE 110 are implemented by one or more of the processors 614. One or more presentation components 616 presents data indications to a person or other device. Exemplary one or more presentation components 616 include a display device, speaker, printing component, vibrating component, etc. I/O ports 618 allow computing device 600 to be logically coupled to other devices including I/O components 620, some of which may be built into computing device 600. Illustrative I/O components 620 include a microphone, joystick, game pad, satellite dish, scanner, printer, wireless device, etc.

Radio(s) 624 represents a radio that may facilitate communication with a wireless telecommunications network. For example, radio(s) 624 may be used to establish communications with components of the RAN 102, operator core network 106, and/or core network edge 105. A radio module of a UE 110 may be implemented at least in part by the radio(s) 524. Illustrative wireless telecommunications technologies include CDMA, GPRS, TDMA, GSM, and the like. Radio(s) 624 may additionally or alternatively facilitate other types of wireless communications including Wi-Fi, WiMAX, LTE, and/or other VoIP communications. In some embodiments, radio(s) 624 may support multimodal connections that include a combination of 3GPP radio technologies (e.g., 4G, 5G, and/or 6G) and/or non-3GPP radio technologies. As can be appreciated, in various embodiments, radio(s) 624 can be configured to support multiple technologies and/or multiple radios can be utilized to support multiple technologies. In some embodiments, the radio(s) 624 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 7:
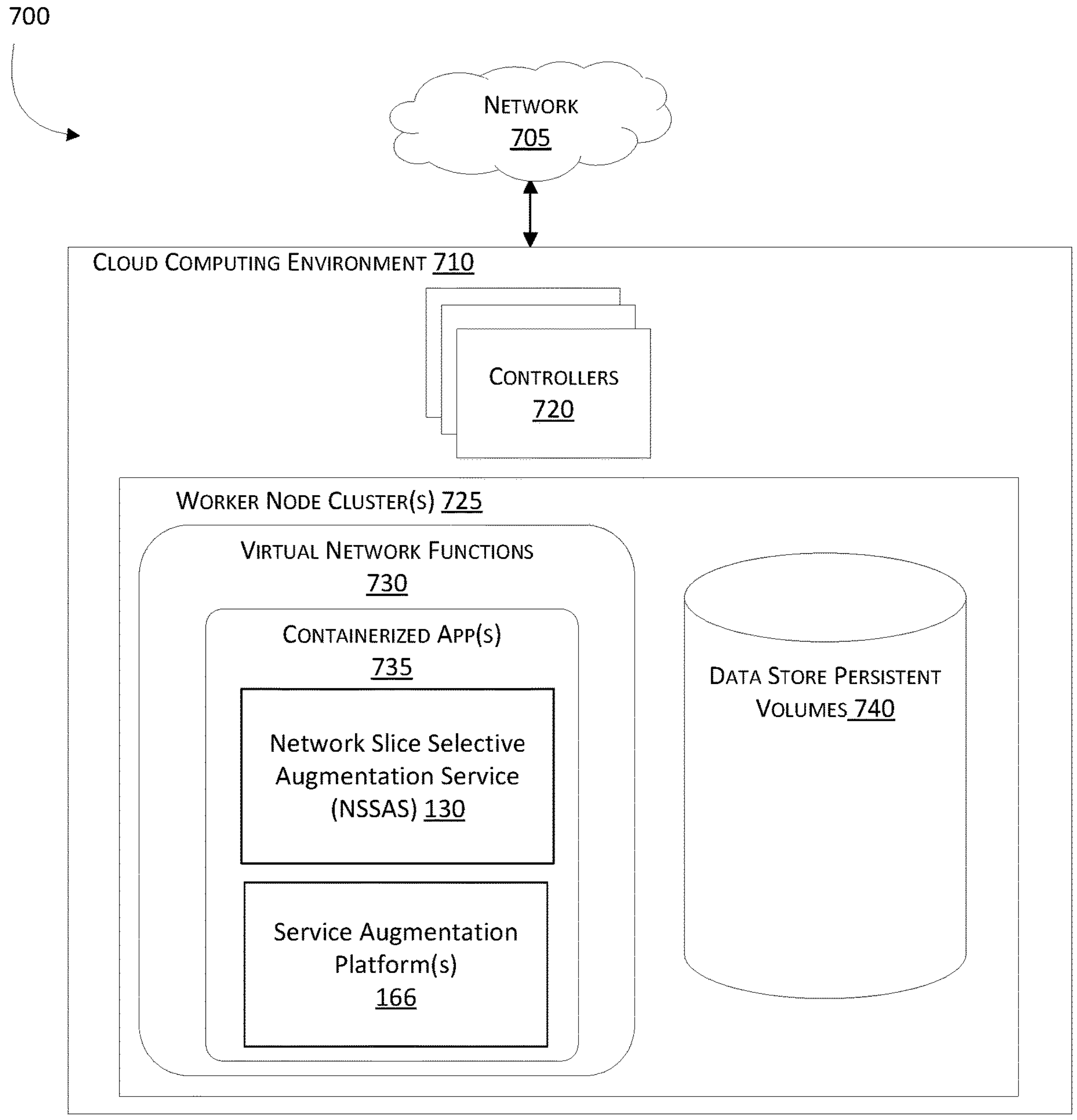
FIG. 7 is an example cloud computing platform, in accordance with some embodiments described herein.

Referring to FIG. 7, a diagram is depicted generally at 700 of an exemplary cloud computing environment 710 for implementing one or more aspects of an architecture for an NSSAS 130 and/or service augmentation platform(s) 166, as implemented by the systems and methods described herein. Cloud computing environment 710 is but one example of a suitable cloud computing environment and is not intended to suggest any limitation as to the scope of use or functionality of the embodiments presented herein. Neither should cloud computing environment 710 be interpreted as having any dependency or requirement relating to any one or combination of components illustrated. In some embodiments, the cloud computing environment 710 is coupled to a network 705 and executed within operator core network 106, the core network edge 105, edge server 164, or is otherwise coupled to the core network edge 105 or operator core network 106.

Cloud computing environment 710 includes one or more controllers 720 comprising one or more processors and memory. The controllers 720 may comprise servers of a data center. In some embodiments, the controllers 720 are programmed to execute code to implement at least one or more aspects of the NSSAS 130 and/or service augmentation platform(s) 166. For example, in one embodiment an NSSAS 130 and/or service augmentation platform(s) 166 as discussed herein may be implemented as one or more virtual network functions (VNFs) 730 (which may include one or more container network functions (CNFs)) running on a worker node cluster 725 established by the controllers 720.

The cluster of worker nodes 725 may include one or more orchestrated Kubernetes (K8s) pods that realize one or more containerized applications 735. In other embodiments, another orchestration system may be used. For example, the worker nodes 725 may use lightweight Kubernetes (K3s) pods, Docker Swarm instances, and/or other orchestration tools. In some embodiments, one or more elements of the network environment 100 may be implemented by, or coupled to, the controllers 720 of the cloud computing environment 710 by operator core network 106 and/or core network edge 105. In some embodiments, one or more elements of the NSSAS 130 and/or service augmentation platform (such as event data 147, for example) may be implemented at least in part using one or more data store persistent volumes 740 in the cloud computing environment 710.

In various alternative embodiments, system and/or device elements, method steps, or example implementations described throughout this disclosure (such as the UE, access networks, core network edge, operator core network, network functions, NSSAS, service augmentation platform(s), and/or any of the sub-parts thereof, for example) may be implemented at least in part using one or more computer systems, field-programmable gate arrays (FPGAs), application-specific integrated circuits (ASICs), or similar devices comprising a processor coupled to a memory and executing code to realize that elements, processes, or examples, said code stored on a non-transient hardware data storage device. Therefore, other embodiments of the present disclosure may include elements comprising program instructions resident on computer-readable media that when implemented by such computer systems enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read-only memory (ROM), non-volatile ROM, programmable ROM (PROM), erasable-programmable ROM (E-PROM), random-access memory (RAM), or any other form of permanent, semi-permanent, or temporary memory storage system of a device having a physical, tangible form. Program instructions include, but are not limited to, computer-executable instructions executed by computer system processors and hardware description languages such as Verilog or Very High Speed Integrated Circuit (VHSIC) Hardware Description Language (VHDL).

As used herein, the terms "network function," "unit," "server," "node," and "module" are used to describe computer processing components and/or one or more computer-executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings, which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for dynamic edge computing resource management, the system comprising:
- one or more processors; and
- one or more computer-readable media storing computer-usable instructions that, when executed by the one or more processors, cause the one or more processors to:
  - determine, using a network function of an operator core network for a telecommunications network, event data corresponding to a planned event instance, wherein the event data includes at least an indication of an event type and an event location;
  - assign the planned event instance with a network service classification based at least on the event type;
  - orchestrate a service augmentation platform on an edge server of a core network edge of the operator core network, the service augmentation platform orchestrated to support a network slice based at least on the network service classification and the edge server selected from a plurality of edge servers based at least on a proximity of the edge server to at least one radio access network having a coverage area that includes at least a portion of the event location; and
  - selectively allocate the network slice providing access to the service augmentation platform to one or more user equipment (UE) in communication with the at least one radio access network based on a correspondence between a geolocation of the one or more UE and the event location.

2. The system of claim 1, the one or more processors further to:
- instantiate, at the service augmentation platform, one or more instances of network functions of the operator core network based at least in part on the network service classification.

3. The system of claim 1, the one or more processors further to:
- instantiate, at the service augmentation platform, one or more instances of cloud-based service supplemental applications based at least in part on the network service classification, wherein the one or more instances of cloud-based service supplemental applications are associated with at least one cloud-based service accessible to the one or more UE via the at least one radio access network.

4. The system of claim 1, the one or more processors further to:
- de-orchestrate the service augmentation platform based on a duration of the planned event instance indicated by the event data.

5. The system of claim 1, the one or more processors further to:
- deallocate the network slice providing access to the service augmentation platform to the one or more UE based at least on one or more of: the one or more UE leaving a geolocation area associated with the event location, or a duration of the planned event instance indicated by the event data.

6. The system of claim 1, wherein the proximity of the edge server to the at least one radio access network is based on at least one of: a number of network device hops or a physical distance.

7. The system of claim 1, the one or more processors further to:
- determine the network service classification from the event data based on at least one of: a machine learning model trained as an inference engine, or a natural language processing (NLP) algorithm.

8. The system of claim 1, the one or more processors further to:
- instantiate, at the service augmentation platform, a virtual private network (VPN) service accessible to the one or more user equipment (UE).

9. The system of claim 1, the one or more processors further to, using the network function:
- monitor for a presence of the one or more UE within a geolocation region associated with the event location;
- based at least on detecting the presence, sending a notification message to the one or more UE displaying an option to elect access to the service augmentation platform; and
- based on an authorization from the one or more UE in response to the notification message, trigger the one or more UE to transmit a request to the operator core network to allocate the network slice providing access to the service augmentation platform to the one or more UE.

10. The system of claim 9, wherein the request to the operator core network comprises a packet data unit (PDU) modification request indicating a network slice identifier associated with the service augmentation platform.

11. The system of claim 9, wherein the request to the operator core network comprises a network slice identifier provided to the one or more UE by the network function, the network slice identifier associated with the service augmentation platform.

12. A telecommunications network, the network comprising:

an operator core network;

at least one edge server coupled to a core network edge of the operator core network;

at least one radio access network coupled to the operator core network, wherein the at least one radio access network establishes one or more communication links between the operator core network and one or more user equipment (UE); and at least one network function executed on one or more processors of the operator core network to perform one or more operations to:

determine event data corresponding to a planned event instance within a coverage area of the at least one radio access network, wherein the event data includes at least an indication of an event type and an event location;

assign a network service classification to the planned event instance based at least on the event type;

orchestrate a service augmentation platform on the at least one edge server, the service augmentation platform orchestrated to support a network slice based at least on the network service classification and the at least one edge server selected from a plurality of edge servers based at least on a proximity of the at least one edge server to the at least one radio access network; and selectively allocate the network slice providing access to the service augmentation platform to the one or more UE in communication with the at least one radio access network within a geolocation region associated with the event location.

13. The network of claim 12, the at least one edge server comprising one or more second processors to:

in response to an instruction from the at least one network function, instantiate, at the service augmentation platform, one or more instances of network functions of the operator core network based at least in part on the network service classification.

14. The network of claim 12, the at least one edge server comprising one or more second processors to:

in response to an instruction from the at least one network function, instantiate, at the service augmentation platform, one or more instances of cloud-based service supplemental applications based at least in part on the network service classification, wherein the one or more instances of cloud-based service supplemental applications are associated with at least one cloud-based service accessible to the one or more UE via the at least one radio access network.

15. The network of claim 12, wherein the at least one network function determines the network service classification from the event data based on at least one of: a machine learning model trained as an inference engine, or a natural language processing (NLP) algorithm.

16. The network of claim 12, the one or more operations further to:

de-orchestrate the service augmentation platform based on a duration of the planned event instance indicated by the event data; and deallocate the network slice providing access to the service augmentation platform to the one or more UE based at least on one or more of: the one or more UE leaving a geolocation area associated with the event location, or the duration of the planned event instance indicated by the event data.

17. The network of claim 12, the one or more operations further to:

monitor for a presence of the one or more UE within the geolocation region;

based at least on detecting the presence, sending a notification message to the one or more UE, the notification message displaying an option to elect access to the service augmentation platform; and based on an authorization from the one or more UE in response to the notification message, trigger the one or more UE to transmit a request to the operator core network to allocate the network slice providing access to the service augmentation platform to the one or more UE.

18. The network of claim 12, the one or more operations further to:

select the at least one edge server from a plurality of edge servers based at least on determining that the proximity of the at least one edge server to the at least one radio access network is within a threshold proximity.

19. A method comprising:

determining, using a network function of an operator core network for a telecommunications network, event data corresponding to a planned event instance, wherein the event data includes at least an indication of an event type and an event location;

assign the planned event instance with a network service classification based at least on the event type;

orchestrating a service augmentation platform on an edge server of the operator core network, the service augmentation platform orchestrated to support a network slice based at least on the network service classification and the edge server selected from a plurality of edge servers based at least on a proximity of the edge server to at least one radio access network having a coverage area that includes at least a portion of the event location; and selectively allocate the network slice providing access to the service augmentation platform to one or more user equipment (UE) in communication with the at least one radio access network based on a location of the one or more UE with respect to a geolocation region associated with the event location.

20. The method of claim 19, the method further comprising:

based at least on detecting a presence of the one or more UE within the geolocation region, sending a notification message to the one or more UE, the notification message comprising an option to elect access to the service augmentation platform; and based on an authorization from the one or more UE in response to the notification message, triggering the one or more UE to transmit a request to the operator core network to allocate the network slice providing access to the service augmentation platform to the one or more UE.

* * * * *